Oct. 14, 1969    R. D. MORTON ET AL    3,472,400

VARIABLE AIR JET DELIVERY SYSTEM

Filed March 4, 1968

INVENTORS
ROBERT D. MORTON
EDWARD G. GROHOSKI

BY *Lindsey, Prutzman and Fraya*

ATTORNEYS

United States Patent Office 3,472,400
Patented Oct. 14, 1969

3,472,400
VARIABLE AIR JET DELIVERY SYSTEM
Robert D. Morton, West Hartford, and Edward G. Grohoski, Litchfield, Conn., assignors to The Hartford Special Machinery Company, Simsbury, Conn., a corporation of Connecticut
Filed Mar. 4, 1968, Ser. No. 710,162
Int. Cl. B65g 59/06; B65h 3/08; B21g 3/32
U.S. Cl. 214—8.5                                3 Claims

ABSTRACT OF THE DISCLOSURE

A variable air jet delivery system for discharging work blanks from a gate controlled track and having means for shifting an air ejection force profile relative to the axial length of the work blank shanks for ensuring uniform translatory movement of different types of work blanks.

---

Figure 1:
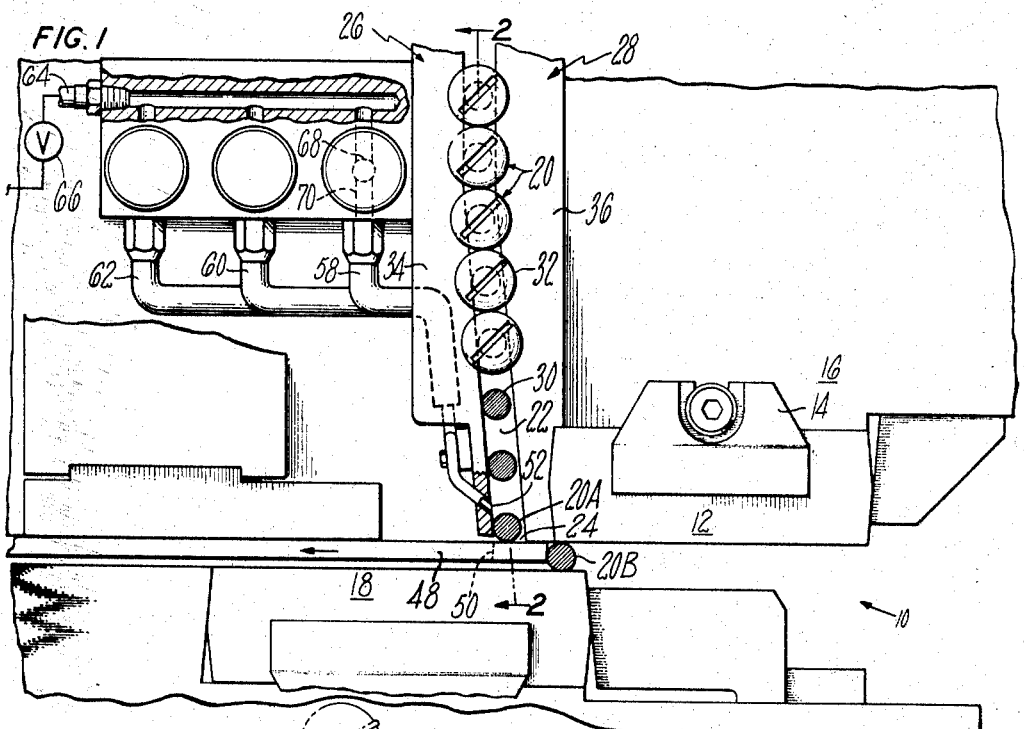

This invention generally relates to work blank delivery systems for threaded rollers, slot formers, head trimmers, point formers and similar machines and particularly concerns an improvement of the delivery system which is the subject of the United States Patent No. 3,324,697, entitled "Thread Roller Feeding Mechanism," issued June 13, 1967, and assigned to the assignee of this invention.

A principal object of this invention is to provide an improved work blank delivery system which can be varied in accordance with individual specifications of different types of work blanks to ensure precision controlled, high speed delivery thereof to a work station.

Another object of this invention is to provide a delivery system of the type described which is economically manufactured and readily installed for use in both new and existing machines.

A further object of this invention is to provide such an improved delivery system which is quick and easy to adjust for different job requirements in minimal set-up time.

Still another object of this invention is to provide a work blank delivery system which significantly improves the reliability of work blank delivery in a high production operation while also providing increased machine flexibility.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
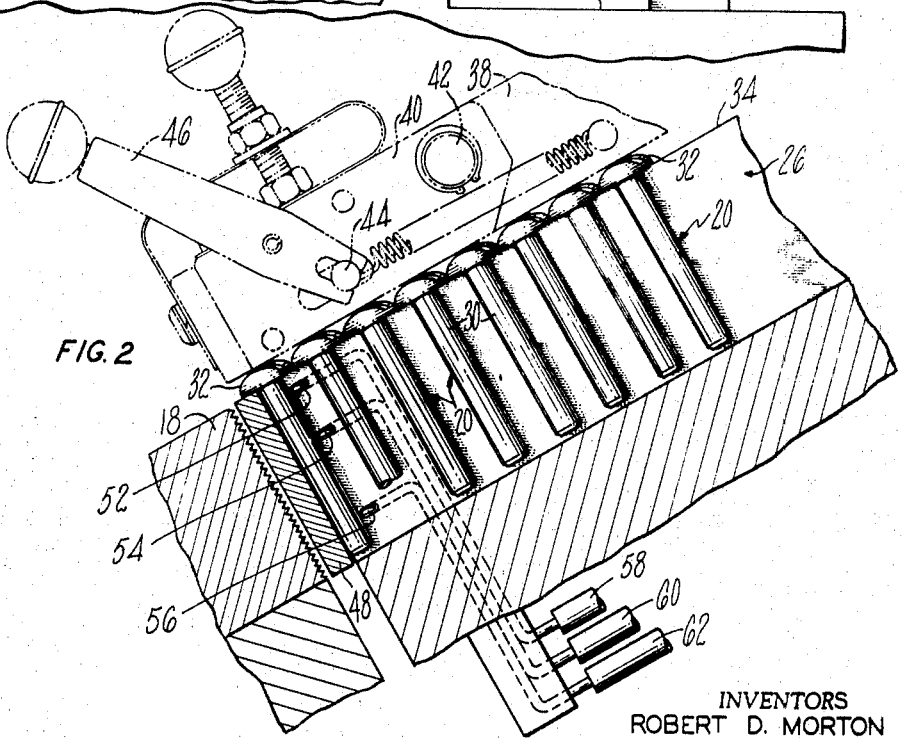

In the drawing:

FIG. 1 is a plan view, partly broken away and partly in section, showing a machine incorporating a preferred embodiment of a work blank delivery system of this invention; and FIG. 2 is a section view, partly broken away, generally taken along line 2—2 of FIG. 1.

Referring now in detail to the drawing, a work blank delivery system is shown installed on a portion of a machine 10 of a type similar to that described in United States Patent No. 3,117,473, entitled "Thread Rolling Machine," issued Jan. 14, 1964, and assigned to the assignee of this invention. While this invention is described for purposes of illustration in connection with a thread roller, it will be understood that this delivery system is susceptible of application in various apparatus such as slot formers, head trimmers, point formers and similar machines.

FIG. 1 shows a fixed die 12 secured by a clamp 14 to a bed 16 of the machine 10 to cooperate with a movable die 18 driven by a suitable mechanism, not shown, such as that described in United States Patent No. 3,117,473 to reciprocate in a direction parallel to the fixed die 12 to form threads on headed work blanks 20.

The work blanks 20 are shown loaded in a column in an inclined gravity feed track 22 having a discharge end 24 adjacent the leading edges of the dies 12, 18. The opposite end of the track 22 extends from a suitable hopper, not shown, of a type similar to that described in United States Patent No. 3,324,697, entitled "Thread Roller Feeding Mechanism," issued June 13, 1967, and assigned to the assignee of this invention. The track 22 is defined by a pair of parallel feed rails 26, 28 mounted on the bed 16 of the machine 10 in spaced apart relation. It will be understood that suitable screw adjustment brackets, not shown, can be provided to selectively position the feed rails 26, 28 such that the track 22 receives the shank portions 30 of the work blanks 20 with their headed portions 32 being supported on the upper edges 34 and 36 of the feed rails 26 and 28.

A track cover 38 is mounted on the machine 10 in overlying relation to the track 22 and is vertically adjusted by any suitable means, not shown, in a selected position spaced above but parallel to the feed rails 26, 28. At the forward end portion of the main track cover 38 is a movable extension cover portion 40 shown in broken lines. The extension cover portion 40 is connected to the main track cover 38 by a pivot pin 42 and incorporates a latch mechanism 44 controlled by an operating lever 46 whereby malformed work blanks are readily removed. For further details of the preferred track cover, reference is made to the above identified United States Patent No. 3,117,473 and United States Patent No. 3,191,423, entitled "Feed Device for Thread Rolling Machine and the Like," issued June 29, 1965, and assigned to the assignee of this invention.

To wedge each work blank 20 in succession between the stationary and movable dies 12, 18 in their starting position (as viewed in FIG. 1) in timed relation to the reciprocation of the movable die 18, a reciprocable gate or starter blade 48 is provided. Starter blade 48 is driven by any suitable mechanism such as the one shown in United States Patent No. 3,371,820, entitled "Improved Starter Mechanism for Thread Rolling Machines," issued Mar. 5, 1968, and assigned to the asignee of this invention. As the starter blade 48 moves to the left as viewed in FIG. 1 to its fully retracted position shown by dotted line 50, the leading work blank 20A must be moved from the track 22 into the path of the starter blade 48 so that upon its return movement the work blank 20A will assume a properly oriented thread rolling position as occupied by work blank 20B. The delivery of the work blanks 20 must be accomplished in an extremely short time interval which may be in the order of 0.005 second depending upon the operating speed of the machine 10. Accordingly, it is imperative that as the starter blade 48 is retracted, each of the leading work blanks 20A is moved at once without tipping but with a translatory motion relative to the feed rails 26, 28 and into engagement with the face of the movable die 18.

To provide increased machine flexibility wherein a single machine is capable of rapidly delivering a variety of work blanks of different types, the delivery system of this invention effects forced work blank feeding by the provision of a variable air jet profile which is predetermined in accordance with the size and the mass distribution of the particular work blanks which are to be delivered to the work station.

More specifically, three orifices 52, 54 and 56 are shown in the preferred embodiment as being formed in the feed rail 26 adjacent the discharge end 24 of the track 22. The orifices 52, 54, 56 are disposed at varying preselected distances from the upper edge 34 of the feed rail 26 in a plane perpendicular thereto with each orifice being disposed rearwardly of the leading work blank 20A adjacent the starter blade 48 whereby the orifices are aligned in parallel relation to the longitudinal axis of the work blank 20A.

So that a major velocity component of an air jet emitted from each orifice moves in a direction of feed of the work blanks 20 and past the discharge end 24 of the track 22, the orifices 52, 54, 56 are respectively connected to individual lines 58, 60, 62, formed of tubing and disposed at an acute angle of approximately 30° relative to the feed rail 26. Each of the lines 58, 60, 62 is connected to a common air supply line 64 having an ON/OFF valve control 66. The common air supply line 64 is connected in a well known manner to a source of compressed air, not shown, and it will be understood that the valve control 66 may be adapted to be turned on and off with the machine 10 for the purpose of automatically activating and deactivating the delivery system.

To provide a customized air ejection force profile, individual valves such as at 68 are preferably installed in each line 58, 60, 62 downstream of the ON/OFF valve control 66 for selectively controlling the air flow through each of the orifices. Accordingly, the height of the force profile may be readily varied relative to the feed rails 26, 28 and the work blank shank 30 such that, by regulating the valves 68 in accordance with the weight and size of the work blanks 20 being fed to the work station, the force profile of the air ejection forces is shifted to an optimum condition particularly suited for ensuring uniform translational movement of the individual blanks. Needle valves capable of fine adjustment have been found to work satisfactorily for precisely regulating the size of their respective air passageway downstream of the common supply line 64, such as that passageway shown at 70 connected to line 58, with each individual needle valve 68 preferably being settable to an OFF position, a fully OPEN position and any intermediate position for maximum flexibility.

Accordingly, the variable force profile of the resultant air stream impinging on the work blank shank resting against the starter blade can be infinitely varied in accordance with the characteristics of the particular series of work blanks being fed to assure a smooth constant flow of blanks to the work station. Such a system provides reliable work blank delivery and is readily installed in both new and existing machines for maximum machine flexibility while ensuring high production operation over a wide range of job requirements.

As will be apparent to persons skilled in the art, various modifications and adaptations of the structure above-described will become readily apparent without departure from the spirit and scope of the invention.

We claim:

1. In an apparatus of a type handling headed work blanks each having a shank portion, a delivery system comprising a pair of feed rails defining a track having a discharge end, a movable gate extending across the discharge end of the track, air ejection means in one of the feed rails for discharging air in a predetermined force profile against a shank portion of a work blank adjacent the gate, and regulating means for shifting said force profile relative to the axial length of the work blank shank to impart varying ejection forces on different types of work blanks while yet ensuring translational movement thereof relative to the feed rails irrespective of the work blank size and distribution of its mass.

2. The delivery system of claim 1 wherein the air ejection means comprises a plurality of orifices formed in said one feed rail adjacent the discharge end of the track and a corresponding number of passages respectively connected to the orifices, and wherein the regulating means comprises individual control means in each of the passages for selectively varying the flow of air through each of the orifices.

3. The delivery system of claim 2 further including a common supply line in communication with each of the passages for supplying thereto air under pressure, and an ON/OFF valve control in the common supply line upstream of the individual control means for activating and deactivating the system.

References Cited
UNITED STATES PATENTS 2,156,822   5/1939   Smith.
3,324,697   6/1967   Reiley _____ 72—90

GERALD M. FORLENZA, Primary Examiner

GEORGE F. ABRAHAM, Assistant Examiner

U.S. Cl. X.R.
10—165; 221—278